United States Patent Office 3,726,718
Patented Apr. 10, 1973

3,726,718
COMPOSITIONS CONTAINING LITHIUM, POTASSIUM, SULFATE AND NITRATE AND/OR NITRITE IONS
Geoffrey W. Mellors, Strongsville, Ohio, assignor to Union Carbide Corporation, New York, N.Y.
No Drawing. Filed Nov. 25, 1970, Ser. No. 92,829
Int. Cl. H01m *11/00*
U.S. Cl. 136—154
5 Claims

ABSTRACT OF THE DISCLOSURE

Compositions containing lithium, potassium, sulfate and nitrate and/or nitrite ions become good ionic conductors at temperatures above about 130° C. and are useful as electrolytes in electrochemical devices for use at temperatures in the ionically conductive range. In the composition which to all appearances is solid a liquid phase containing substantially all of the nitrate and/or nitrite ions is present encapsulated by a solid phase containing substantially all of the sulfate ions.

---

This invention relates to ionic conductors for use in solid state electrochemical devices and refers more particularly to compositions containing lithium and sulfate ions and which exhibit a marked change from high resistance ionic conductance to low resistance ionic conductance at or near a temperature which will be referred to herein as their "transition temperature."

Ionic conductivity is usually associated with the flow of ions through an aqueous solution of metallic salts. In the vast majority of practical uses of ionic conductors, i.e. as electrolytes for dry cell batteries, the aqueous solution is immobilized in a paste or gelled matrix to overcome the difficulties associated with handling and packaging a liquid. However, even after immobilization, the system is still subject to possible leakage, has a limited shelf life due to drying out or crystallization of the salts and is suitable for use only within a limited temperature range corresponding to the liquid range of the electrolyte. In addition, the necessity of including a large volume of immobilizing material has hindered the aims of miniaturization.

In attempting to overcome the shortcomings of liquid systems, investigators have surveyed a large number of solid compounds hoping to find compounds which are solid at room temperature and have specific conductances approaching those exhibited by the commonly used liquid systems. Most solids have specific conductances at room temperature (20° C.) in the range of $10^{-6}$ to $10^{-15}$ ohm$^{-1}$$_{cm.-1}$ as compared to aqueous solutions of salts which normally have a specific conductance of 0.5 to 0.8 ohm$^{-1}$$_{cm.-1}$. A specific conductance below about $5\times10^{-4}$ ohm$^{-1}$$_{cm.-1}$ is considered poor. A good specific conductance is above about $1\times10^{-3}$ ohm$^{-1}$$_{cm.-1}$.

Much effort has been expended in research to provide solid materials of good ionic conductivity. Among the best known of such materials is silver iodide and mixtures of it with other materials. Although solid compositions based on silver iodide have useful conductance, their cost is relatively high, and the search for other materials continues. Recently, lithium sulfate has been studied in view of the observation that this salt has good ionic conductivity at temperatures above 575° C. although it has very poor conductance at room temperature. In U.S. Pat. 3,506,490, it is disclosed that if a lithium halide is mixed with lithium sulfate, the resulting mixture is a good ionic conductor at temperatures as low as 400° C.

It is the principal object of this invention to provide a composition based on lithium sulfate which while to all outward appearances is a solid, has good ionic conductance at elevated temperatures well below the transition temperature of lithium sulfate. More specifically, it is an object of the invention to provide an electrolyte composition containing lithium and sulfate ions which has a transition temperature below about 180° C. and is useful in electrochemical devices.

The invention is based on the discovery that solid compositions containing potassium ions and nitrate or nitrite ions in addition to lithium and sulfate ions have transition temperatures of about 130° C. and below and maintain good ionic conductance at temperatures up to about 250° C. The invention accordingly comprises compositions containing lithium and potassium cations and sulfate and nitrate or nitrite or mixtures of nitrate and nitrite anions. It is essential to the invention that the four ions poassium, lithium, sulfate and nitrate or nitrite be present in the composition. Other ions may be present; indeed another feature of the invention is the addition of ions which have the tendency to lower the transition temperatures of compositions containing the essential four ions.

Chemically, the simplest of compositions embodying the invention are those which may be regarded as a mixture of lithium sulfate and potassium nitrate or a mixture of lithium sulfate and potassium nitrite. Although it is convenient to regard the compositions as such, and although the compositions may and are conveniently made by fusing together lithium sulfate and potassium nitrate or potassium nitrite and by solidifying the fused mixture, the sources of the four essential ions are of no particular relevance to the invention other than convenience and availability. For example, it is entirely possible to prepare a composition embodying the invention from potassium sulfate and lithium nitrate. In further discussion herein, for conciseness reference will be to the melt in terms of lithium sulfate and potassium nitrate.

Furthermore, since the materials used are initially in finely divided form and are then fused and solidified, any reported analysis of the composition at different times and conditions is somewhat arbitrary. What is determined in the composition is the proportion of ions present rather than specific compounds formed between anions and cations. For instance, the starting material may be a simple mixture of lithium sulfate and potassium nitrate. The melt contains the four ions, but there may be four compounds, $Li_2SO_4$, $K_2SO_4$, $LiNO_3$ and $KNO_3$ present. Or the composition may be expressed in terms of three compounds: $Li_2SO_4$; $LiNO_3$ and $KNO_3$. In the following discussion the compositions, always expressed in terms of mol percent, are sometimes referred to as containing four compounds and sometimes as containing three compounds. This is not to say that those specific compounds can be certainly identified as being present; the significant, essential fact is that the four ions are present in the composition in the ratios of anions to cations represented by the formulas recited.

To produce a composition embodying the invention a melt containing sufficient potassium and nitrate ions to provide three mols of potassium nitrate to one mol of lithium sulfate may be prepared by heating the appropriate salts in admixture to a temperature high enough to melt all. As the melt so produced is cooled, a mixture of potassium sulfate and lithium sulfate is precipitated. At about 440° C. a composition containing in molar percentage about 36.5% lithium sulfate, 6.2% lithium nitrate and 57.3% potassium nitrate is produced. Upon further cooling below 440° C. a mixture of lithium sulfate and potassium sulfate begins to separate the nitrates remaining liquid. This separation continues until about 130° C. when the solids are in equilibrium with a liquid having a composition of about 0.5 mol percent $Li_2SO_4$;

40.7 mol percent $LiNO_3$; 58.8 mol percent $KNO_3$. Any further cooling below 130° C. causes the solidification of the liquid, and the composition becomes totally solid.

Although from the foregoing discussion it might be concluded that the lithium sulfate-potassium nitrate mixture behaves much as any molten salt mixture on cooling, observation of this system shows it to behave in a very unusual manner. Thus, whereas under normal circumstances a solution upon cooling consists of a precipitating solid and a supernatant liquid, in the present case, the solid remains dispersed throughout the liquid resulting in an extremely viscous material which below about 230° C. by reason of its extreme viscosity has the appearance and characteristics of a solid. For example at temperatures below about 200° C. a metal rod "frogen" in place in the material cannot be removed without the application of excessive force or by melting. However, if the material is compressed at 150° C., liquid is expressed from it, and this liquid is substantially the composition given above that is, 0.5 mol percent $Li_2SO_4$; 40.7 mol percent $LiNO_4$; 58.8 mol percent $KNO_3$. Thus, the composition of the invention at temperatures above 130° C. contains a liquid phase physically entrapped or encapsulated within a solid phase. In this respect the material resembles a gel. Experimental evidence shows that substantially all of the nitrate ions are in the liquid phase and substantially all of the sulfate ions are in the solid phase.

In the foregoing discussion, the starting material was a mixture providing three mols of potassium nitrate to 1 mol of lithium sulfate. The composition of the invention may be prepared from mixtures containing lithium sufate and potassium nitrate in different molar proportions. For instance, the molar proportions of potassium nitrate to lithium sulfate may range from 1 to 3 to 7 to 1. However, experience has shown that for optimum results the sulfate concentration should be low enough to prevent excessive precipitation of sulfate on cooling. On the other hand, if the nitrate content (particularly the lithium nitrate) is too high, being raised at the expense of sulfate, the transition temperature of the composition is undesirably raised. Since the melt is prepared at temperatures above 440° C., and the composition 36.5 mol percent lithium sulfate, 6.2 mol percent lithium nitrate and 57.3 mol percent potassium nitrate is formed as the melt is cooled to 440° C. as above discussed, an initial mixture containing the materials in these molar proportions is desirable. The minimum proportions of sulfate to nitrate needed to produce a composition embodying the invention is expressed in the composition 13.9 mol percent lithium sulfate; 33.1 mol percent lithium nitrate; 47.9 mol percent potassium nitrite; 5.1 mol percent potassium sulfate.

A large number of compositions embodying the invention have been prepared. These compositions have been tested for conductance, and representative data are set forth in the following tables.

TABLE I

Conductance of compositions in the $KNO_3Li_2SO_4$ system

| Composition (mol): | Sp. conductivity, 130° C. (ohm$^{-1}_{cm.}$$^{-1}$) |
|---|---|
| $KNO_3$ | $\approx 10^{-7}$ |
| $95KNO_3$—$Li_2SO_4$ | $1.6 \times 10^{-4}$ |
| $7KNO_3$—$Li_2SO_4$ | $2.9 \times 10^{-3}$ |
| $3KNO_3$—$Li_2SO_4$ | $3.6 \times 10^{-3}$ |
| $KNO_3$—$Li_2SO_4$ | $3.8 \times 10^{-4}$ |
| $KNO_3$—$3Li_2SO_4$ | $1.1 \times 10^{-4}$ |
| $Li_2SO_4$ | $< 10^{-7}$ |

As has been stated above, it is essential that the composition of the invention contain the four ions lithium, potassium, sulfate, and nitrate and/or nitrite. To demonstrate this requirement, the conductance of some compositions deficient in one or another of these ions are appended in Table II.

TABLE II

Conductance of nitrate-sulfate materials deficient in requirements of the invention

| Composition (mol): | Sp. conductivity at 130° C. (ohm$^{-1}_{cm.}$$^{-1}$) |
|---|---|
| $KNO_3$—$Na_2SO_4$ | $\approx 10^{-6}$ |
| $LiNO_3$—$Li_2SO_4$ | $\approx 10^{-6}$ |
| $5NaNO_3$—$Li_2SO_4$ | $3.6 \times 10^{-5}$ |
| $3AgNO_3$—$Li_2SO_4$ | $1.0 \times 10^{-5}$ |
| $3RbNO_3$—$Li_2SO_4$ | $\approx 10^{-6}$ |
| $Ca(NO_3)_2$—$Li_2SO_4$ | $\approx 10^{-6}$ |
| $Ba(No_3)_2$—$Li_2SO_4$ | $\approx 3.3 \times 10^{-7}$ |
| $CsNO_3$—$3LiNO_3$—$Li_2SO_4$ | $\approx 10^{-6}$ |

The differences between, on the one hand,

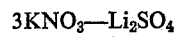

and on the other $KNO_3$—$Na_2SO_4$ and $LiNO_3$—$Li_2SO_4$ will be apparent from Table II. The former has a specific conductance of $3.6 \times 10^{-3}$ ohm$^{-1}_{cm.}$$^{-1}$ at 130° C., which is good, whereas that of the latter pair is about $1.0 \times 10^{-6}$ ohm$^{-1}_{cm.}$$^{-1}$ which is poor.

To determine the effect of other ions added to the composition of the invention a series of compositions containing different additives was prepared. Such compositions and observed data are set forth in Table III.

TABLE III.—ADDITIONS TO POTASSIUM NITRATE-LITHIUM SULFATE

| Composition (mol) | Sp. conductance (ohm$^{-1}_{cm}$$^{-1}$) | Temperature (°C.) |
|---|---|---|
| $6.75KNO_3$-$2.25Li_2SO_4$-$1.0ZnCl_2$ | $3.3 \times 10^{-4}$ | 130 |
| $6.75KNO_3$-$2.25Li_2SO_4$-$1.0ZnCl_2$ | $1.1 \times 10^{-4}$ | 95 |
| $Li_2SO_4$-$0.5MgSO_4$-$4.5KNO_3$ | $2.6 \times 10^{-4}$ | 133 |
| $Li_2SO_4$-$MgSO_4$-$6KNO_3$ | $1 \times 10^{-3}$ | 130 |
| $Li_2SO_4$-$2MgSO_4$-$9KNO_3$ | $5.9 \times 10^{-3}$ | 130 |
| $Li_2SO_4$-$MgSO_4$-$4KNO_3$-$2LiNO_3$ | $5.4 \times 10^{-3}$ | 130 |
| $Li_2SO_4$-$MgSO_4$-$2KNO_3$-$4LiNO_3$ | $2.9 \times 10^{-3}$ | 130 |
| $Li_2SO_4$-$2MgSO_4$-$6KNO_3$ | $1.25 \times 10^{-3}$ | 130 |
| $3KNO_3$-$Li_2SO_4$+10 wt. percent $KCl$ | $3.3 \times 10^{-4}$ | 105 |
| $3KNO_3$-$Li_2SO_4$+10 wt. percent $KBr$ | $4.0 \times 10^{-4}$ | 130 |
| $3KNO_3$-$Li_2SO_4$+10 wt. percent $KI$ | $9.0 \times 10^{-4}$ | 108 |
| $3KNO_3$-$Li_2SO_4$+10 wt. percent $CdCl_2$ | $3.1 \times 10^{-4}$ | 93 |
| $3KNO_3$-$Li_2SO_4$+10 wt. percent $CdI_2$ | $4.0 \times 10^{-4}$ | 103 |
| $3KNO_3$-$Li_2SO_4$-$Li_2CO_3$ | $2.5 \times 10^{-4}$ | 132 |
| $3KNO_3$-$Li_2SO_4$-$K_2CrO_4$ | $1 \times 10^{-4}$ | 96 |
| $1.5KNO_3$-$1.5NaNO_3$-$Li_2SO_4$ | $3.6 \times 10^{-3}$ | 130 |
| $1.5KNO_3$-$1.5NaNO_3$-$Li_2SO_4$ | $1 \times 10^{-3}$ | 100 |
| $4TlNO_3$-$2KNO_3$-$Li_2SO_4$ | $4 \times 10^{-4}$ | 78 |

It will be observed from the data in Table IV below that compositions containing nitrite tend to exhibit a lower transition temperature than do compositions containing no nitrite ion. A number of compositions have been prepared in which nitrite is wholly or partially substituted for nitrite. Results of representative tests of such materials are set forth in Table IV.

TABLE IV.—NITRITE-SULFATE AND NITRATE-NITRITE-SULFATE MATERIALS

| Composition (mol) | Sp. conductance (ohm$^{-1}$ cm$^{-1}$) | Temperature (°C.) |
|---|---|---|
| $KNO_2$-$Li_2SO_4$ | $2.2 \times 10^{-3}$ | 84 |
| $3KNO_2$-$Li_2SO_4$ | $3.3 \times 10^{-3}$ | 85 |
| $1.5KNO_2$-$1.5NaNO_2$-$Li_2SO_4$ | $2.3 \times 10^{-3}$ | 65 |
| $2.5KNO_2$-$2.5KNO_3$-$Li_2SO_4$+10 wt. percent $KBO_2$ | $1.0 \times 10^{-3}$ | 90 |
| $2.5KNO_2$-$2.5KNO_3$-$Li_2SO_4$ | $3.8 \times 10^{-3}$ | 85 |
| $1.5KNO_2$-$1.5KNO_2$-$Li_2SO_4$ | $8.0 \times 10^{-3}$ | 98 |
| $1.5KNO_3$-$1.5KNO_2$-$Li_2SO_4$-$MgSO_4$ | $2.0 \times 10^{-4}$ | 130 |
| $KNO_2$-$Li_2SO_4$+10 wt. percent $KBr$ | $1.4 \times 10^{-3}$ | 84 |

In preparing the compositions listed in the foregoing tables, the powdered starting materials were intimately mixed. The powder was placed in a copper crucible or glass beaker and melted in a dry air atmosphere. Electrodes of platinum were inserted into the melt and permitted to remain as the melt was cooled to a solid, the electrodes freezing in place for ease in determining conductance. Conductance was determined by measuring the resistance of the melt between platinum electrodes using a standard 1000 cycle conductance bridge on heating and cooling cycles. The observed resistivity data was converted mathematically to specific conductance values reported in the tables.

It will be evident from the discussion above and the data in the tables that the invention provides materials, apparently solid, which in the range of about 130° C. to 240° C., exhibit good ionic conductivity although at room temperature the materials are at best very high resistance conductors. Their properties recommend their use as electrolytes in solid state battery systems and in other electrochemical devices such as electrolytic capacitors, coulometers and the like, the operation of which depends upon an electrolyte of good ionic conductivity. Their sharp transition temperature renders them particularly suited for such devices which are inoperative at temperatures below their transition temperatures but consistently operative at temperatures above their transition temperatures.

A number of cells have been made utilizing compositions of the invention to determine their operability. In these cells a lithium sheet anode was used. The electrolyte employed was of a composition containing three mols potassium nitrate to one mol lithium surface. A cathode mix consisting of a depolarizer either of mercuric oxide (HgO) or lead dioxide ($PbO_2$), graphite, acetylene black and a small portion of electrolyte was used. Specifically the lithium anode was 0.010" thick, the electrolyte layer was 0.004" thick and weighed about 0.7 gram. The cathode mix contained two grams of the mercuric oxide or lead dioxide, 0.7 gram graphite, 1.5 grams of the electrolyte and 0.02 gram acetylene black. The cell elements were compressed and a nickel sheet cathode collector was applied to the cathode mix, the entire cell including the cathode collector then being encapsulated in polytrifluorochloroethylene.

The open circuit voltage of cells so prepared was determined at elevated temperatures and several of the cells were tested under load conditions. The cell systems, the temperature of test and the open circuit voltages are set forth in Table V. The relatively high open circuit voltages exhibited by the cells are evident from the table.

TABLE V

| Cell systems | Temperature, ° C. | Open circuit voltage, volts |
|---|---|---|
| Li/3$KNO_3$-$Li_2SO_4$/HgO | 150 | 3.6 |
| Li/3$KNO_3$-$Li_2SO_4$/$PbO_2$ | 150 | 3.5 |
| Li/$KNO_2$-$Li_2SO_4$/HgO | 100 | 3.2 |

In tests of the cells under load, generally it was found that they delivered 2 to 5 milliamperes per square inch at about 2.5 volts at the appropriate cell operating temperature. In a specific instance, a cell utilizing a lithium anode, a mercuric oxide cathode mix and an electrolyte containing three mols of potassium nitrate to one mol of lithium sulfate delivered a current in this range at about 2.5 volts over a continuous period of eight hours at 150° C.

Other metals than lithium may be used as anodes in cells containing the electrolyte composition of the invention, of course, including zinc, aluminum, magnesium, strontium, and calcium. Other cathodes than those mentioned may also be used including iodic acid, potassium permanganate and other materials high in oxygen and containing a reducible element. Iodic acid and other active cathode materials are the subject of application Ser. No. 92,830 filed concurrently herewith in the name of D. V. Louzos and assigned to the assignee of this invention.

The specific examples of cells utilizing the electrolyte of the invention are described for purposes of illustration merely. As indicated, the cell components such as anode and cathode may vary and the dimensions given in the examples may be changed.

What is claimed is:

1. In a solid state electrochemical device a solid electrolyte composition consisting essentially of the fusion and solidification product of a mixture of lithium and potassium salts selected from the group consisting of nitrates, nitrites, and sulfates, said mixture containing the anions nitrate and/or nitrite and sulfate and the cations lithium and potassium in molar proportions expressed in terms of potassium nitrate, potassium nitrite or mixtures thereof to lithium sulfate of 1 to 3 to 7 to 1, which composition is characterized in having a transition temperature below about 130° C. below which transition temperature said product is a poor ionic conductor, having a specific ionic conductance not greater than $5 \times 10^{-4}$ $ohm^{-1}_{cm.-1}$ but above which transition temperature, said composition contains a liquid phase encapsulated within a solid phase, and has a specific ionic conductance of at least $1.0 \times 10^{-3}$ $ohm^{-1}_{cm.-1}$.

2. In a solid state electrochemical device an electrolyte as defined by claim 1 in which said ions are present in said mixture in proportions represented by the molar ratio of about 3 mols of potassium nitrate to 1 mol of lithium sulfate.

3. In a solid state electrochemical device an electrolyte as defined by claim 1 in which said ions are present in said mixture in proportions represented by the molar ratio of about 1 mol of potassium nitrite to 1 mol of lithium sulfate.

4. In a solid state electrochemical device an electrolyte composition as defined by claim 1, said composition being in appearance and characteristics entirely solid below its transition temperature but having above its transition temperature a liquid phase containing substantially all of said nitrate and/or nitrite anions, said liquid phase being encapsulated by a solid phase containing substantially all of said sulfate anions.

5. In a solid state electrochemical device an electrolyte as defined by claim 1 in which the essential ions are present in said mixture in proportions represented by the molar ratio of about 1.5 mols of potassium nitrate and 1.5 mols of potassium nitrite to 1 mol of lithium sulfate.

References Cited
UNITED STATES PATENTS

| 266,262 | 10/1882 | Shaw | 136—153 |
| 512,510 | 1/1894 | Hewett | 136—153 |
| 3,506,490 | 4/1970 | Buzzelli | 136—6 |

FOREIGN PATENTS

| 1,099,465 | 11/1963 | Great Britain | 136—153 |

WINSTON A. DOUGLAS, Primary Examiner

H. A. FEELEY, Assistant Examiner

U.S. Cl. X.R.
252—62.2; 317—230